US012612301B2

(12) United States Patent
Jardine

(10) Patent No.: US 12,612,301 B2
(45) Date of Patent: Apr. 28, 2026

(54) STIRRUP SAFETY RETAINER

(71) Applicant: D&L Equine Innovations, LLC, Lipan, TX (US)

(72) Inventor: Lila Rose Jardine, Lipan, TX (US)

(73) Assignee: D&L Equine Innovations, LLC, Lipan, TX (US)

( * ) Notice: Subject to any disclaimer, the term of this patent is extended or adjusted under 35 U.S.C. 154(b) by 0 days.

(21) Appl. No.: 18/680,857

(22) Filed: May 31, 2024

(65) Prior Publication Data

US 2024/0400373 A1 Dec. 5, 2024

Related U.S. Application Data

(60) Provisional application No. 63/577,932, filed on Jun. 2, 2023.

(51) Int. Cl.
*B68C 3/00* (2006.01)

(52) U.S. Cl.
CPC ........ *B68C 3/00* (2013.01); *B68C 2003/0066* (2013.01)

(58) Field of Classification Search
CPC .............. B68C 3/00; B68C 2003/0066; B68C 2003/0033; B68C 2003/005
See application file for complete search history.

(56) References Cited

U.S. PATENT DOCUMENTS 820,250 A * 5/1906 Patterson ................. A43B 7/32 36/72 R
884,197 A * 4/1908 McTigue .................. B68C 3/02 54/49
3,978,596 A * 9/1976 Brown ................... A43B 3/122 36/11.5
4,525,939 A * 7/1985 McNeil .................. A43C 15/06 36/114
4,799,709 A * 1/1989 Francois ................. B60R 22/00 2/311

(Continued)

FOREIGN PATENT DOCUMENTS

GB 2152355 A * 8/1985 ........... A43B 5/0419
KR 101356651 B1 * 2/2014

OTHER PUBLICATIONS https://web.archive.org/web/20210919191932/https://www.rubberband.com/blog/how-a-10-rubber-band-can-make-a-foot-of-difference/ (Year: 2015).*

*Primary Examiner* — Jason W San
*Assistant Examiner* — Matthew J Sullivan
(74) *Attorney, Agent, or Firm* — Knobbe, Martens, Olson & Bear, LLP

(57) ABSTRACT

A stirrup safety retainer for use with a stirrup on a saddle for a horse is disclosed. The safety stirrup retainer can include a first strap having a first end and a second end. A first connector can attach to the first end of the first strap and a second connector can attach to the second end of the first strap, such that when the first and second connectors are brought together, they are configured to releasably joining the first and second end of the first strap. The stirrup safety retainer can further include a second strap connected to the first strap. The stirrup safety retainer can further include a third strap connected to the first strap. The first and second connectors can comprise, respectively, male and female portions of a safety breakaway buckle.

16 Claims, 11 Drawing Sheets

(56) References Cited

U.S. PATENT DOCUMENTS

| | | | | | |
|---|---|---|---|---|---|
| 4,856,211 | A * | 8/1989 | Phillips | A43B 5/14 | 36/131 |
| 5,263,726 | A * | 11/1993 | Wood | B62B 3/1452 | 280/33.993 |
| 5,826,413 | A * | 10/1998 | Bostock | B68C 3/02 | 54/49 |
| 6,513,309 | B1 * | 2/2003 | Morgante | B68C 3/00 | 54/47 |
| 6,938,623 | B2 * | 9/2005 | Graupner | B62B 3/1452 | 128/869 |
| 7,651,169 | B2 * | 1/2010 | Collins | B62B 3/144 | 297/485 |
| 8,429,837 | B1 * | 4/2013 | Galustian | A43C 17/00 | D30/142 |
| 9,017,235 | B2 * | 4/2015 | Khademi | A61H 1/024 | 482/121 |
| 11,365,114 | B2 * | 6/2022 | Lee | B68C 3/00 | |
| 11,970,386 | B2 * | 4/2024 | Godoy | B68C 3/00 | |
| 12,404,165 | B2 * | 9/2025 | Elliot | B68C 3/00 | |
| 2004/0200097 | A1 * | 10/2004 | Boyd | A43B 5/02 | 36/74 |
| 2015/0360062 | A1 * | 12/2015 | Oliver | A62B 35/0037 | 182/8 |

* cited by examiner

STIRRUP SAFETY RETAINER

This application claims the benefit of U.S. Provisional Application No. 63/577,932, entitled "STIRRUP SAFETY RETAINER," filed on Jun. 2, 2023, which is hereby incorporated by reference in its entirety.

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field of the Invention

The field relates to stirrup safety retainer for horseback riding applications.

Description of the Related Art

There have been a number of more complex ways invented and proposed to keep feet in stirrups but release in case of an accident. For example, U.S. Pat. No. 8,371,046 and published US Patent Application No. 2009/0229146 each disclose a kind of magnetic boot and stirrup. U.S. Pat. Nos. 7,874,131, 7,225,602 and published US Patent Application No. 2008/0104934 each disclose a kind of bicycle type toe clip design for a boot and stirrup. U.S. Pat. No. 3,812,650 discloses a stirrup for use by a leg amputee.

Currently, many athletes in the horse industry use elastic rubber bands in order to secure their feet in the stirrups during competition. Although elastic rubber bands are faulty and frustrating because of their constant need for replacement, elastic and rubber bands do not remain on the stirrups when they are not in use and this leads to riders neglecting or forgetting to bring their rubber or elastic bands with them and thus, not being fully prepared for competition. Other than rubber bands, other restraints often require assistance to put on, can be unsightly in competitive arenas, and may be outlawed by the governing bodies of various equestrian sports.

SUMMARY

For purposes of summarizing the disclosure and the advantages achieved over the prior art, certain objects and advantages of the disclosure are described herein. Not all such objects or advantages may be achieved in any particular embodiment. Thus, for example, those skilled in the art will recognize that the invention may be embodied or carried out in a manner that achieves or optimizes one advantage or group of advantages as taught herein without necessarily achieving other objects or advantages as may be taught or suggested herein. It will be appreciated that numerous alternative embodiments of the invention are possible.

All of these implementations are intended to be within the scope of the invention herein disclosed. These and other implementations will become readily apparent to those skilled in the art from the following detailed description of the implementations having reference to the attached figures, the invention not being limited to any particular implementations disclosed.

In some implementations, a stirrup safety retainer configured for use with a stirrup on a saddle for a horse, the stirrup safety retainer can include: a first strap having a first end and a second end, wherein a first connector is attached to the first end of the first strap and a second connector is attached to the second end of the first strap, such that when the first and second connectors are brought together, they are configured to releasably join the first and second end of the first strap; a second strap connected to the first strap; and a third strap connected to the first strap.

In some implementations, the first and second connectors include, respectively, male and female portions of a safety breakaway buckle. In some implementations, the first and second connectors include, respectively, male and female portions of a hook and loop material. In some implementations, the first and second connectors include, respectively, materials having magnetic attraction to one another.

In some implementations, the first strap includes an elastic material. In some implementations, the second strap includes an elastic material. In some implementations, the third strap includes an elastic material.

In some implementations, the first and second connectors include, respectively, male and female portions of a safety breakaway buckle and wherein the first, second, and third straps include an elastic material. In some implementations, the first and second connectors comprise, respectively, male and female portions of a hook and loop system and wherein the first, second, and third straps comprise an elastic material. In some implementations, the first and second connectors comprise, respectively, materials having magnetic attraction to one another and wherein the first, second, and third straps comprise an elastic material.

In some implementations, second strap and the third strap are connected to the first strap proximate to the first connector and the second connector, respectively. In some implementations, second strap and the third strap are connected to the first strap at a position at half a length of the first strap. In some implementations, second strap and the third strap are connected to opposite sides of the first strap when the first connector and the second connector are brought together.

In some implementations, a stirrup safety retainer configured for use with a stirrup on a saddle for a horse can include: a first strap having a first end and a second end, wherein a first connection means is attached to the first end of the first strap and a second connection means is attached to the second end of the first strap, such that when the first and second connection means are brought together, they are configured to releasably join the first and second end of the first strap; a second strap connected to the first strap; and a third strap connected to the first strap.

In some implementations, the first and second connection means include, respectively, male and female portions of a safety breakaway buckle. In some implementations, the first and second connection means include, respectively, male and female portions of a hook and loop material. In some implementations, the first and second connection means are, respectively, are materials having magnetic attraction to one another.

In some implementations, the first strap includes an elastic material. In some implementations, the second strap includes an elastic material. In some implementations, the third strap includes an elastic material.

In some implementations, the first and second connection means include, respectively, male and female portions of a safety breakaway buckle and wherein the first, second, and third straps include an elastic material.

In some implementations, the second strap and the third strap are connected to the first strap proximate to the first connection means and the second connection means, respectively. In some implementations, the second strap and the third strap are connected to the first strap at a position at half a length of the first strap. In some implementations, the second strap and the third strap are connected to opposite sides of the first strap when the first connection means and the second connection means are brought together.

In some implementations, a stirrup safety retainer configured to releasably hold a foot of a rider in the stirrup on a saddle for a horse can include: a first strap having a first end and a second end, wherein a first portion of a safety breakaway connector is attached to the first end of the strap and a second portion of a safety breakaway connector is attached a to the second end of the strap, such that when the first and second portions of the safety breakaway buckle are brought together, they are configured to releasably join the first and second end of the first strap; a second strap connected to the first strap; and a third strap connected to the first strap.

In some implementations, the first strap includes an elastic material. In some implementations, the second strap includes an elastic material. In some implementations, the third strap includes an elastic material.

In some implementations, the second strap and the third strap are connected to the first strap proximate to the first portion of the safety breakaway connector and the second portion of the safety breakaway connector, respectively. In some implementations, the second strap and the third strap are connected to the first strap at a position at half a length of the first strap. In some implementations, the second strap and the third strap are connected to opposite sides of the first strap when the first portion of the safety breakaway connector and the second portion of the safety breakaway connector are brought together.

In some implementations, a method to prevent loss of a stirrup from the foot of a rider on a saddle can include: placing an elastic first strap around the toe of the footwear of the rider; and placing an elastic second strap around the heel of the footwear of the rider; wherein the first and second straps are releasably joined to the stirrup.

In some implementations, the first and second strap are joined to a third clastic strap, the third elastic strap being releasably joined to the stirrup. In some implementations, the first and second straps are releasably joined to the stirrup with a safety breakaway buckle. In some implementations, the first and second straps are releasably joined to the stirrup with hook and loop material. In some implementations, the first and second straps are releasably joined to the stirrup with materials having magnetic attraction to one another.

In some implementations, a kit can include: a first strap having a first end and a second end, wherein a first connector is attached to the first end of the strap and a second connector is attached to the second end of the strap, such that when the first and second connectors are brought together, they are configured to releasably join the first and second end of the first strap around the base of a stirrup; a second strap that is configured to form one or more loops for linking with the first strap and wrapping around and securing footwear in the stirrup.

In some implementations, the first and second connectors include, respectively, male and female portions of a safety breakaway buckle. In some implementations, the first and second connectors include, respectively, male and female portions of a hook and loop material. In some implementations, the first and second connectors include, respectively, materials having magnetic attraction to one another.

In some implementations, the first strap includes an elastic material. In some implementations, the second strap includes an elastic material.

In some implementations, the kit includes a third strap, wherein the second strap forms a first loop and the third strap forms a second loop, and wherein the first loop is configured to wrap around and secure a toe of footwear and the second loop is configured to wrapping around and securing a heel of footwear in the stirrup. In some implementations, the first and second connectors include, respectively, male and female portions of a safety breakaway buckle. In some implementations, the first and second connectors include, respectively, male and female portions of a hook and loop material. In some implementations, the first and second connectors include, respectively, materials having magnetic attraction to one another.

In some implementations, the first strap includes an elastic material. In some implementations, the second strap includes an elastic material. In some implementations, the third strap includes an elastic material. In some implementations, the first and second connectors include, respectively, male and female portions of a safety breakaway buckle and wherein the first and second straps include an elastic material. In some implementations, the first and second connectors include, respectively, male and female portions of a safety breakaway buckle and wherein the first, second, and third straps include an elastic material. In some implementations, the stirrup safety retainer includes a stirrup on a saddle for a horse, wherein the stirrup safety retainer is secured to the stirrup.

In some implementations, a stirrup safety retainer can include: a first strap having a first end and a second end, wherein a first connector is attached to the first end of the strap and a second connector is attached to the second end of the strap, such that when the first and second connectors are brought together, they are configured to releasably join the first and second end of the first strap around a base of a stirrup; and a second strap that is configured to form one or more loops for linking with the first strap and wrapping around and securing footwear in the stirrup.

In some implementations, the first and second connectors include, respectively, male and female portions of a safety breakaway buckle. In some implementations, the first and second connectors include, respectively, male and female portions of a hook and loop material. In some implementations, the first and second connectors include, respectively, materials having magnetic attraction to one another.

In some implementations, the first strap includes an elastic material. In some implementations, the second strap includes an elastic material.

In some implementations, the stirrup safety retainer includes a third strap, wherein the second strap forms a first loop and the third strap forms a second loop, and wherein the first loop is configured to wrap around and secure a toe of footwear and the second loop is configured to wrap around and secure a heel of footwear in the stirrup.

In some implementations, the first and second connectors include, respectively, male and female portions of a safety breakaway buckle. In some implementations, the first and second connectors include, respectively, male and female portions of a hook and loop material. In some implementations, the first and second connectors include, respectively, materials having magnetic attraction to one another.

In some implementations, the first strap includes an elastic material. In some implementations, the second strap includes an elastic material. In some implementations, the third strap includes an elastic material.

In some implementations, the first and second connectors include, respectively, male and female portions of a safety breakaway buckle and wherein the first and second straps include an elastic material. In some implementations, the first and second connectors include, respectively, male and female portions of a safety breakaway buckle and wherein the first, second, and third straps include an elastic material. In some implementations, the stirrup safety retainer includes a stirrup on a saddle for a horse, wherein the stirrup safety retainer is secured to the stirrup.

BRIEF DESCRIPTION OF THE DRAWINGS

Various implementations will be described hereinafter with reference to the accompanying drawings. These implementations are illustrated and described by example only and are not intended to limit the scope of the disclosure. In the drawings, similar elements have similar reference numerals.

DETAILED DESCRIPTION

Figure 1:
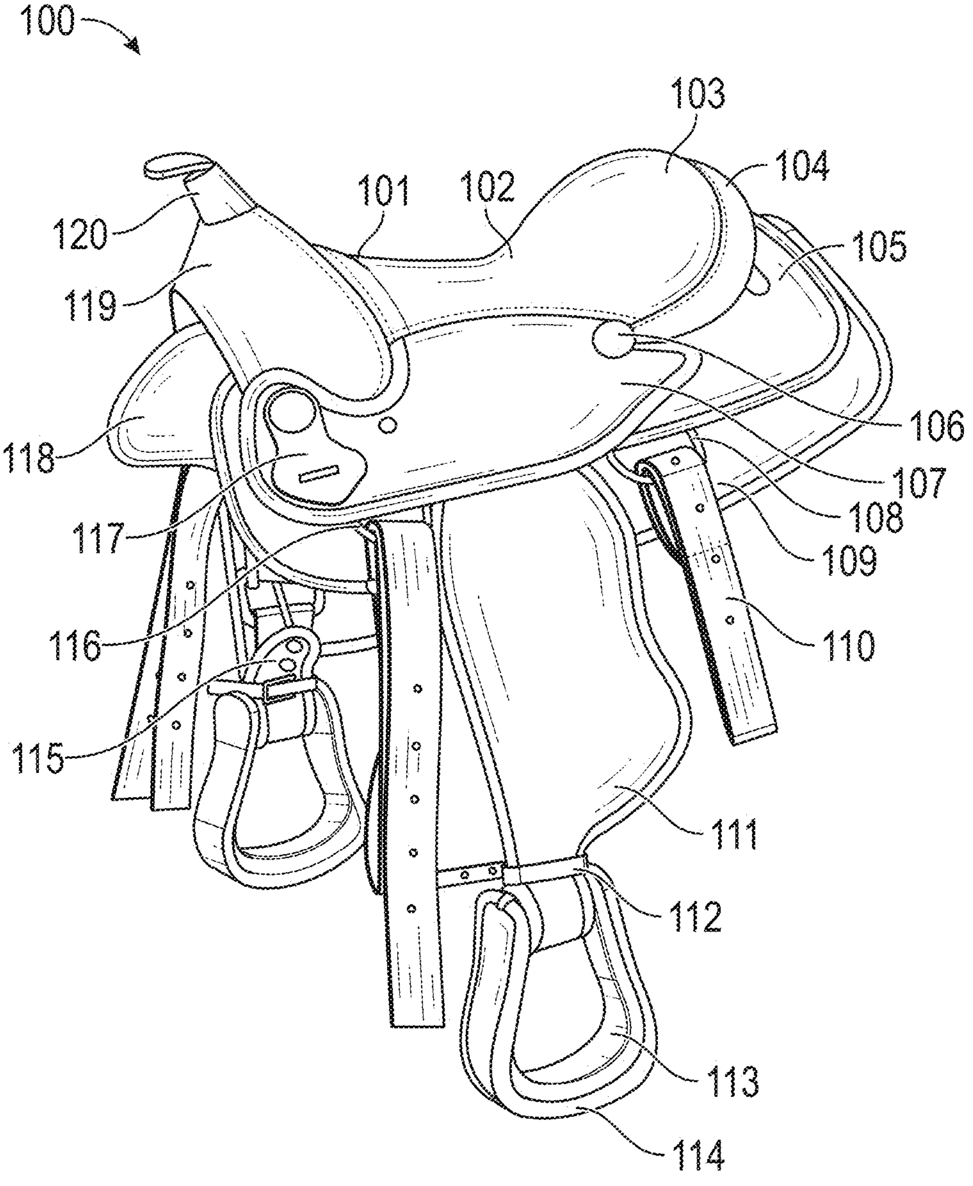
FIG. 1 illustrates a schematic view of a western style saddle.

Although several implementations, examples, and illustrations are disclosed below, it will be understood by those of ordinary skill in the art that the inventions described herein extend beyond the specifically disclosed implementations, examples, and illustrations and includes other uses of the inventions and obvious modifications and equivalents thereof. Embodiments are described with reference to the accompanying figures, wherein like numerals refer to like elements throughout. The terminology used in the description presented herein is not intended to be interpreted in any limited or restrictive manner simply because it is being used in conjunction with a detailed description of some specific embodiments of the inventions. In addition, embodiments can comprise several novel features. No single feature is solely responsible for its desirable attributes or is essential to practicing the inventions herein described.

The present disclosure may be understood by reference to the following detailed description. It is noted that, for purposes of illustrative clarity, certain elements in various drawings may not be drawn to scale, may be represented schematically or conceptually, or otherwise may not correspond exactly to certain physical configurations of implementations.

Typically, stirrups attach to a saddle by straps. In equestrian events and activities, a rider's feet are placed into the stirrups, thereby allowing the rider to maintain their balance on an equine (e.g., a horse).

In certain performance equine sports, there is often a desire for a rider to keep their feet in the stirrups of a saddle so that the rider can optimize communication with the horse through their feet. Often, when a rider is operating on a horse at a high rate of speed, the rider's feet can come out of the stirrups and then the rider loses effective communication with the horse. This is called "losing their stirrup" or "blowing their stirrup." Blowing of the stirrup is especially true in the sports of barrel racing and pole bending and in roping events. The kicking of the horse that the rider often does to accelerate their horse, and the attendant high rates of speed, and the sharp turns, contribute to the rider's feet slipping out of the stirrups and then the rider has difficulty continuing to kick or prod the horse for communicating direction and speed to the horse. Also, sometimes a rider must lift their feet above a barrel or higher on a pole to keep from knocking them over.

While the rider does not want their foot to easily come out the stirrup while riding and directing the horse, the rider does want their foot to be released from the stirrup if they were to fall off the horse to avoid being dragged by the horse.

In order to prevent blowing their stirrups, a rider's foot is held in the stirrup by a variety of make-shift restraints, such as rubber bands, strings, leather, or fabric ties. One of the most common ways that riders have endeavored to keep their feet from coming out of their stirrups but not be stuck to the horse in case of an accident is to take two rubber bands and tie or otherwise affix them together and loop one over the toe of the boot on one side of the stirrup and the other over the heel of the boot or the spur on the opposite side of the stirrup. The trouble with this technique is that the conventional rubber bands break frequently and easily. Also, it is easy to forget to bring rubber bands to competitions and events.

FIG. 1 illustrates a schematic view of a western style saddle 100. The saddle 100 can include a seat rise 101, a seat, 102, a cantle 103, a Cheyenne roll 4, a back jockey 105, a concho 106, a seat jockey 107, a rear rigging dee 108, a skirt 109, a billet strap 110, a fender 111, a hobble strap 112, a tread cover 113, stirrups 114, stirrup leather 115, a front rigging dee 116, a tie strap holder 117, a gullet 118, a pommel 119 (also known as a swell), and/or a horn 120. The stirrup 114 can be attached to the western style saddle 100 of a horse which can provide support for a horseback rider's feet. The stirrup 114 can assist with stability and balance while riding. The stirrup 114 can be comprised of metal, wood, or synthetic materials. The stirrup 114 hang from the western style saddle 100 via adjustable straps also known as stirrup leathers.

Figure 2:
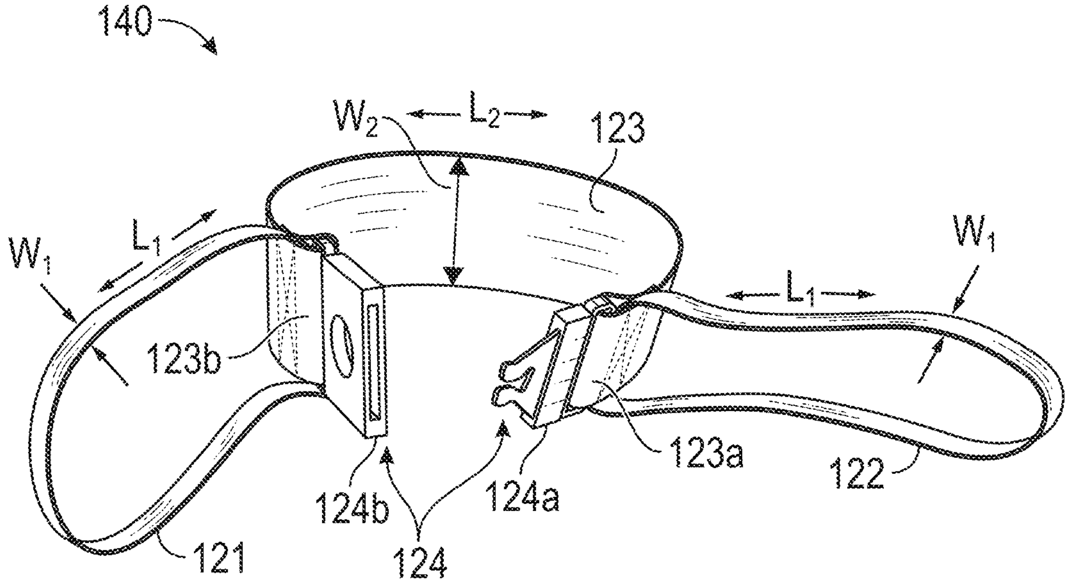
FIG. 2 illustrates a side elevational view of an exemplary stirrup safety retainer with open connectors.
Figure 3:
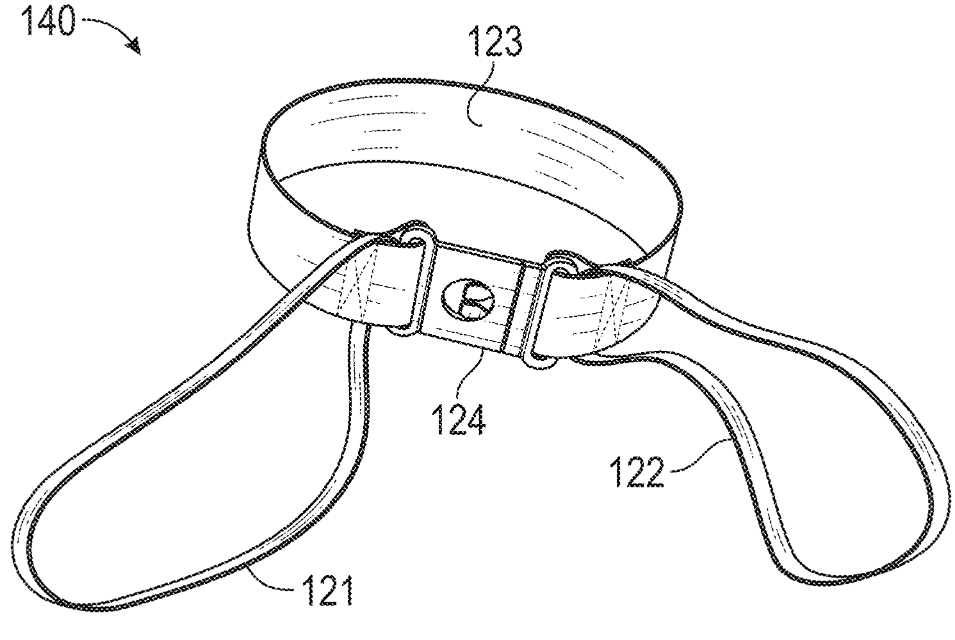
FIG. 3 illustrates a side elevational view of an exemplary stirrup safety retainer with closed connectors.

A rider's feet can be kept in the stirrups 114 by providing, as shown in FIG. 2 and FIG. 3, a stirrup safety retainer 140 (also mentioned herein as a "retainer" and/or a "kit"). The retainer 140 can prevent loss of the stirrup 114 from the foot of a rider on the western style saddle 100. The retainer 140 can include two bands 121, 122 (referred to herein as "securing bands"). A first securing band 121 can surround a frontward portion of a rider's footwear (e.g., toc of the footwear), and a second securing band 122 can surround a rearward portion of the rider's footwear (e.g., heel of the footwear or a spur). The two securing bands 121, 122 can be linked and/or attached to a band 123 (also referred to herein as a "holding band") that surrounds the base of the stirrup 114 and is releasably linked to itself. In some implementations, the retainer 140 can include a plurality of holding bands 123 in which the holding bands 123 are spaced laterally from one another along the stirrup 114. The plurality of holding bands 123 can include at least one of the securing bands 121, 122 can be oriented towards the toe and/or heel of the rider's footwear.

In some implementations, the holding band 123 is linked with a connector 124 comprising a first connector 124*a* at a first end 123*a* of the holding band 123 and a second connector 124*b* at a second end 123*b* of the holding band 123. In some implementations, the first end 123*a* and/or the second end 123*b* can be fitted through a slot of either first connector 124*a* or second connector 124*b*, respectively, to attach. The first connector 124*a* and the second connector 124*b* can be brought together to be releasably joined. In some implementations, the connector 124 comprises a quick release buckle. A quick release buckle can be a fastener designed for rapid and/or easy operation. Quick release buckles can be found in items such as backpacks, sports equipment, safety gear, and/or pet accessories. The quick release buckle can include features such as male and/or female parts that bind (e.g., lock, connect, attach, etc.) together securely. In some implementations, the connector 124 can be released with one hand by pressing a lever and/or squeezing one or more sides. The connector 124 can comprise plastic and/or metal. Example types of the quick release buckle can include side-release, cam, and/or Fidlock buckles, each suited for different applications for secure and/or quickly releasable fastening.

Figure 6:
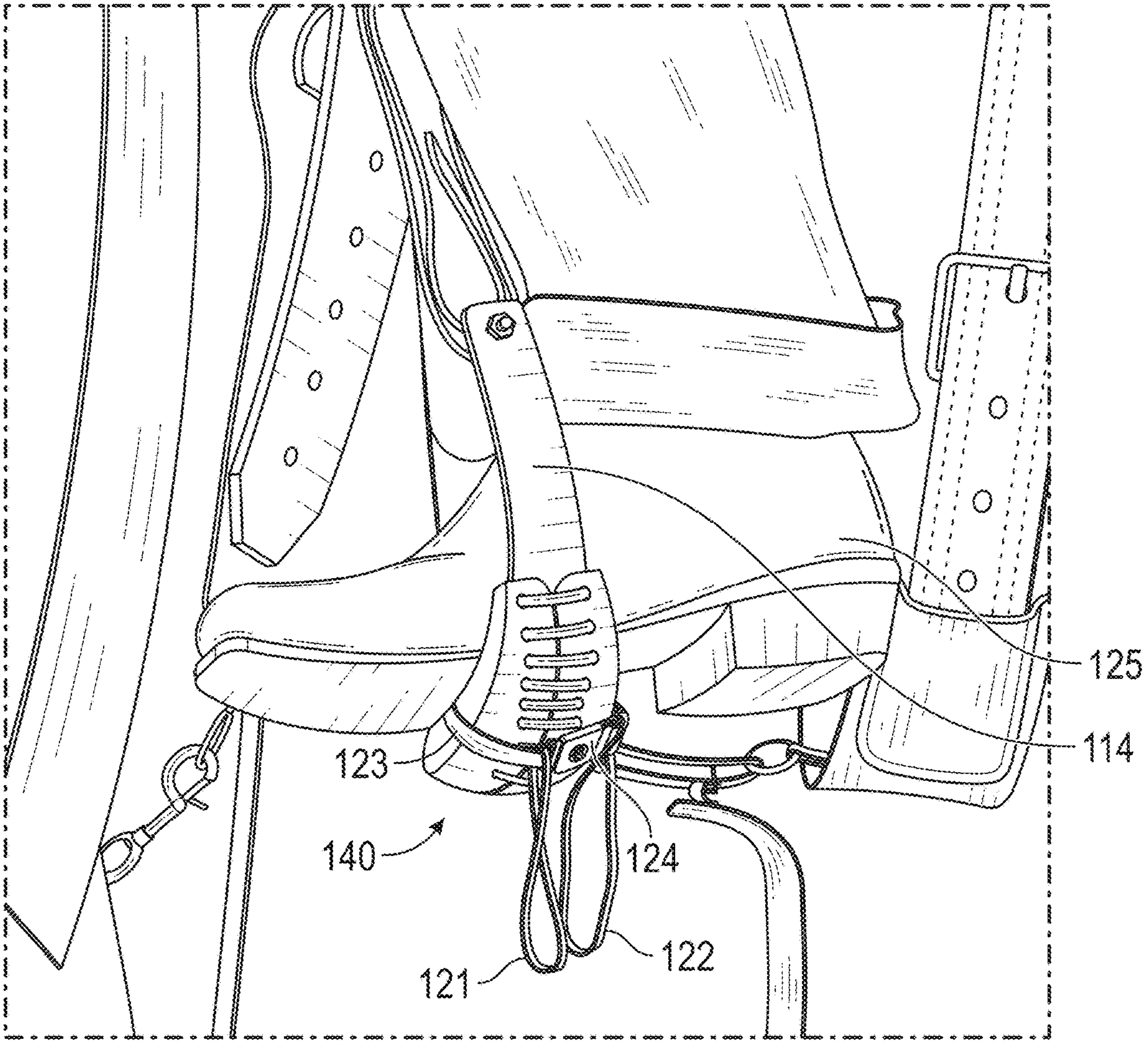
FIG. 6 illustrates a side view of a stirrup with an exemplary stirrup safety retainer deployed thereon.
Figure 7:
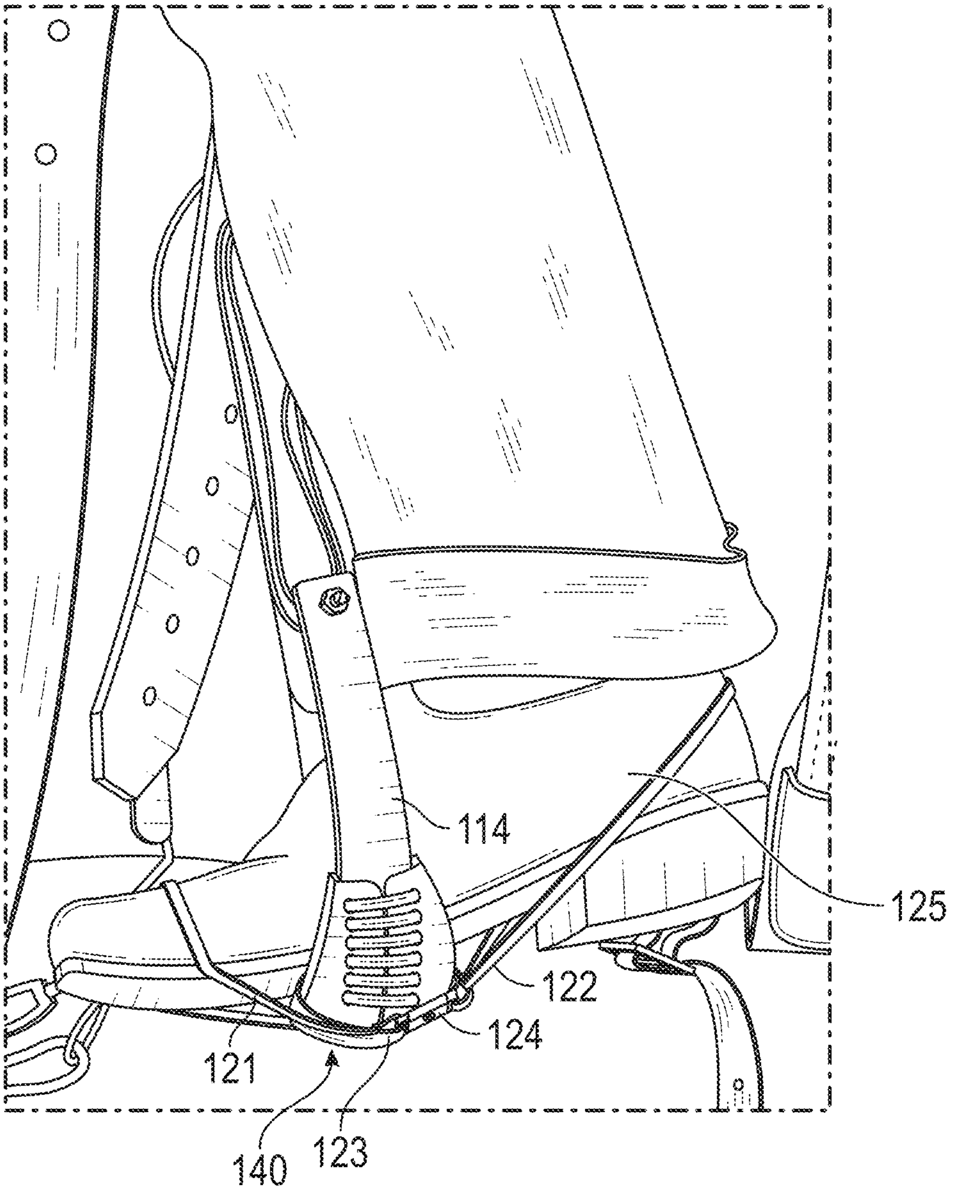
FIG. 7 illustrates a side view of a stirrup with an exemplary stirrup safety retainer deployed thereon securing the boot of a rider in the stirrup.
Figure 9:
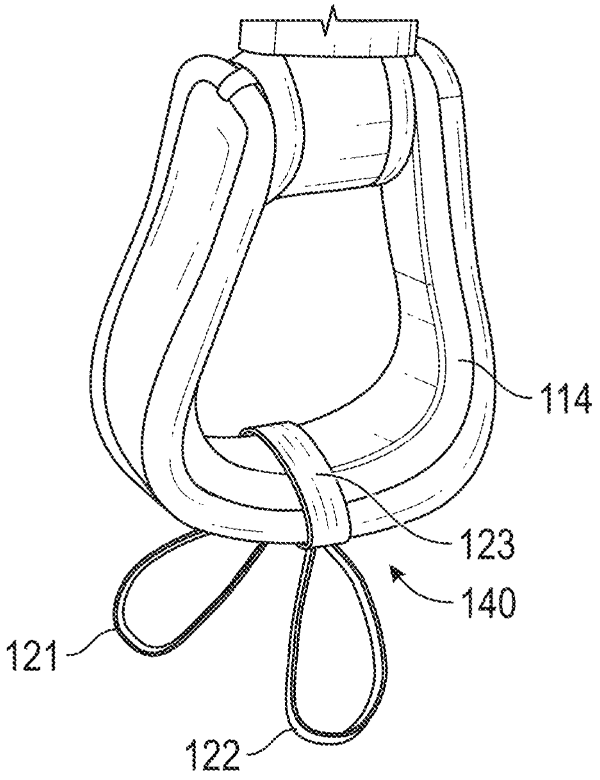
FIG. 9 illustrates a top side elevational schematic view of a stirrup with an exemplary stirrup safety retainer deployed thereon.
Figure 10:
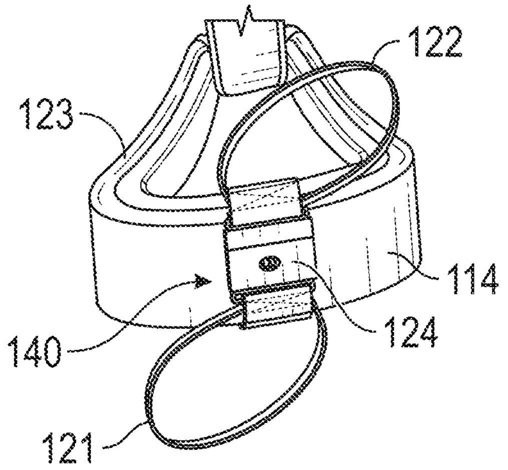
FIG. 10 illustrates a bottom elevational schematic view of a stirrup with an exemplary stirrup safety retainer deployed thereon.
Figure 11:
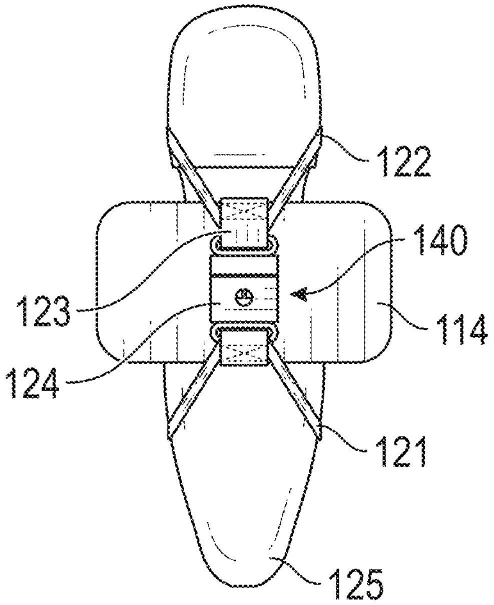
FIG. 11 illustrates a bottom schematic view of a stirrup with a boot inserted and secured in the stirrup by an exemplary stirrup safety retainer.

As shown in FIG. 6 and FIG. 7, the foot 125 (here shown in a boot; also mentioned herein as a "footwear") of the rider can be maintained in the stirrup 114 with the securing bands 121, 122. The securing bands 121, 122 can resist expansion (e.g., stretching) to maintain the footwear 125 on the stirrup 114. Additionally, the securing bands 121, 122 can expand at least approximately 25%, at least approximately 20%, at least approximately 15%, at least approximately 10%, or at least approximately 5% of its original size to allow the rider to adjust the position of the footwear 125 on the stirrup 114. In some implementations, the securing bands 121, 122 cannot expand such that the footwear 125 of the rider remains in a same or approximately same position with little to no movement of the footwear 125. The securing bands 121, 122 can be attached to the stirrup 114 with the holding band 123. The holding band 123 can be secured to itself with the connector 124. However, were a rider to fall from the horse, the connector 124 would pull apart and release from the stirrup 114 leaving the retainer 140 attached to the foot 125, yet free from the stirrup 114. FIGS. 9-11 illustrate various views of the retainer 140 attached to the stirrup 114. FIG. 9 illustrates a top side elevational schematic view of the stirrup 114 with retainer 140 deployed thereon. FIG. 10 illustrates a bottom elevational schematic view of the stirrup 114 with retainer 140 deployed thereon. FIG. 11 illustrates a bottom schematic view of the stirrup 114 with a boot 125 inserted and secured in the stirrup 114 by the retainer 140.

Figure 4:
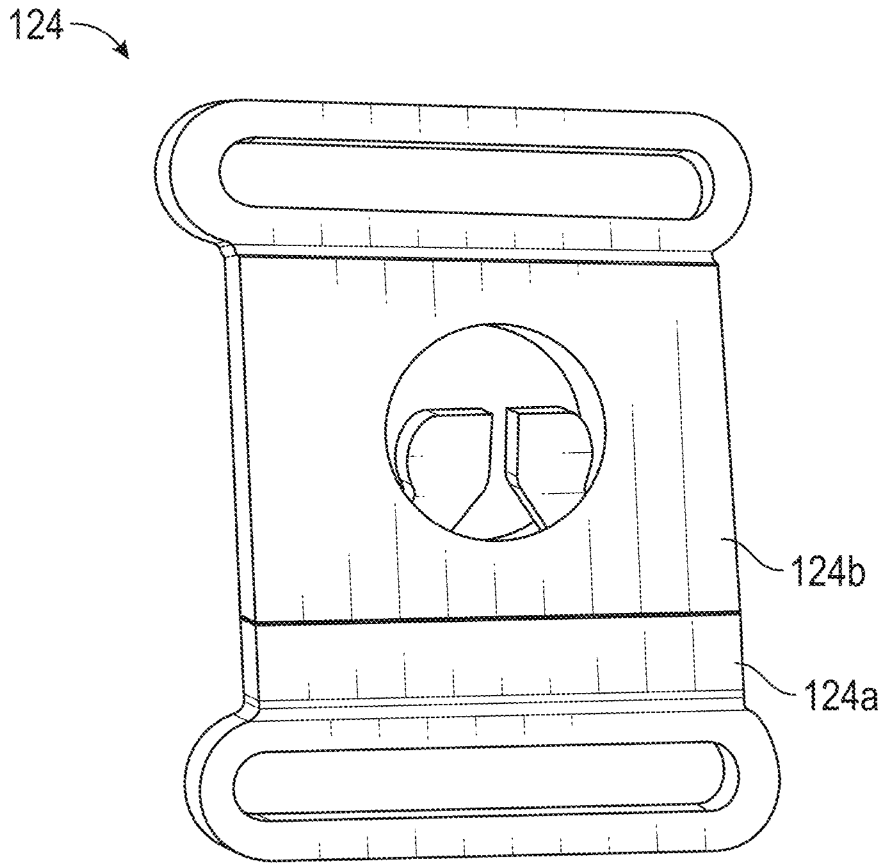
FIG. 4 illustrates a top view of an exemplary connector in a closed position for use with the stirrup safety retainer.
Figure 5:
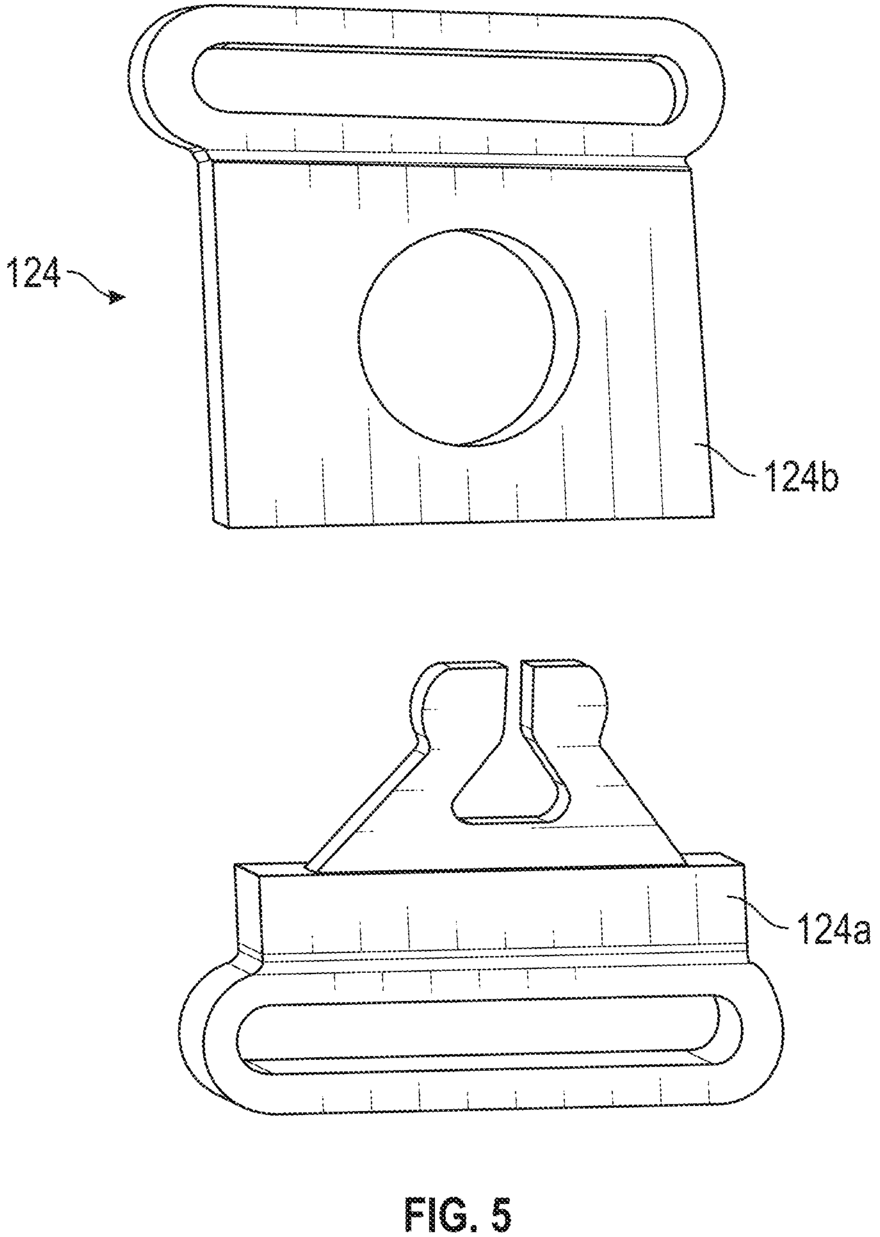
FIG. 5 illustrates a top view of an exemplary connector in an open position for use with the stirrup safety retainer.

In some implementations, as shown in FIG. 4 and FIG. 5 and mentioned above, the connector 124 can be a quick release and/or breakaway connector 124 that can break free in the event of an emergency on horseback. In the event of an emergency in which the connector 124 breaks free, the connector 124 can be reattached for further use. For example, the connector 124 can include snap-fit connection such that the connector 124 can be resecured to the stirrup 114 one or more times. In some implementations, a hook-and-loop system and/or a magnetic system can be used to provide for reusability of the connector 124.

An example of an emergency on horseback can include situations such as if the rider were to fall off their horse. In such an event, the connector 124 can be designed to come apart and/or break free at the point of attachment. Such a safety feature can help prevent the rider from being dragged by the horse due to their foot 125 being caught in the stirrup 114. In the usual event that there is no emergency, such as after the rider safely finishes their competition, the rider is able to remove the securing bands 121, 122 from the toe and/or heel, respectively, of their footwear 125 and take their footwear 125 out of the stirrups 114 and leave the apparatus of the invention on their stirrups for use the next time that they ride.

Figure 8A:
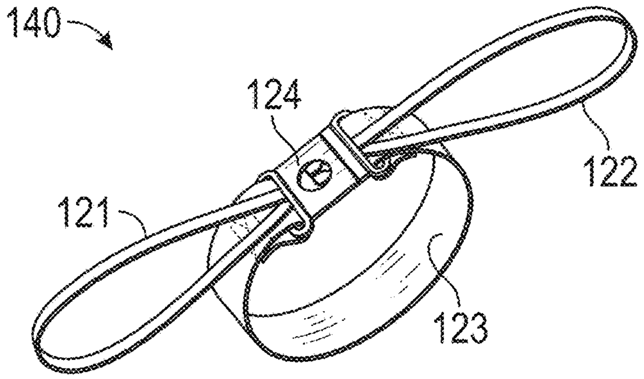
FIGS. 8A-8C illustrates schematic diagrams showing the alternate placement of a securing bands on a holding band.
Figure 8B:
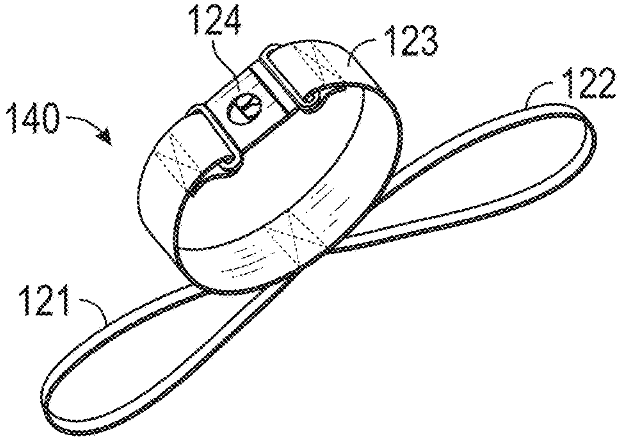
Figure 8C:
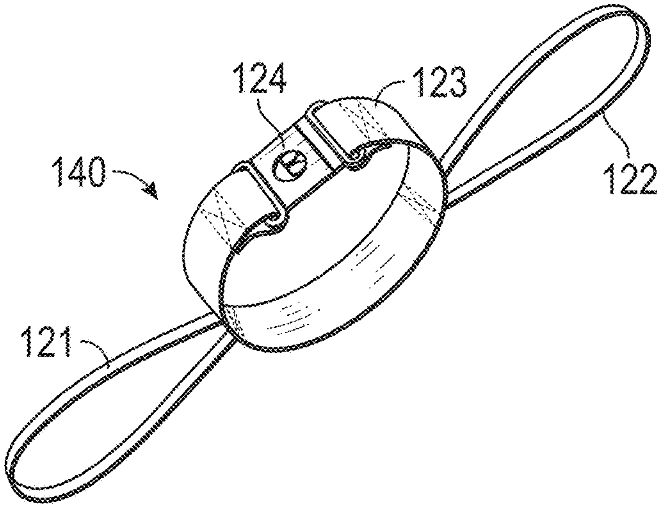

In some implementations, as shown in FIG. 2 and FIG. 3, the securing bands 121, 122 can be individually attached (e.g., sewn, glued, epoxied, etc.) to the holding band 123. For example, one of each end can be attached onto opposite sides of the connector 124. It will be understood, as shown in FIGS. 8A, 8B, and 8C, that the placement of the securing bands 121, 122 can be changed to any position on the holding band 123. The position can generally be chosen, for example, based on material and/or ease of attachment and/or use. For example, as shown in FIG. 8A, the securing bands 121, 122 can be attached to the holding band 123 at and/or near the connector 124. In another example as shown in FIG. 8B, the securing bands 121, 122 can be attached to the holding band 123 at approximately opposite of the connector 124 when the connector 124 is releasably connected (i.e., at a position at half a length of the holding band 123) and/or along the length of the holding band 123 between the first connector 124*a* and second connector 124*b*. For example, the securing bands 121, 122 can be attached to the holding band 123 between approximately 5% to 95%, between approximately 10% to 90%, between approximately 15% to 85%, between approximately 20% to 80%, between approximately 25% to 75%, between approximately 30% to 70%, between approximately 35% to 65%, between approximately 40% to 60%, between approximately 45% to 55%, or between approximately 42.5% to 47.5%, of the length of the holding band 123 from the first connector 124*a* and second connector 124*b*. Additionally, as shown in FIG. 8C, the securing bands 121, 122 can be attached to lateral sides of the holding band 123 when the connector 124 is releasably connected such that the securing bands 121, 122 are positioned on opposite sides from one another.

The securing bands 121, 122 can comprise a variety of materials suitable for the purposes mentioned above. In some implementations, the securing bands 121, 122 can be an clastic material. For example, the securing bands can be made of an elastic material similar to 0.25 inch braided elastic and/or rubber bands. Braided elastic can comprise rubber and/or synthetic threads braided together to form a narrow, flexible brand. Braided elastic can also withstand repeated stretching and tension and can return to its original shape after being stretched. For example, the securing bands 121, 122 can elongate between approximately 25% to 200% of its original length, between approximately 30% to 190% of its original length, between approximately 35% to 185% of its original length, between approximately 40% to 180% of its original length, between approximately 45% to 155% of its original length, between approximately 50% to 175% of its original length, or between approximately 100% to 150% of its original length without breaking.

Figure 12:
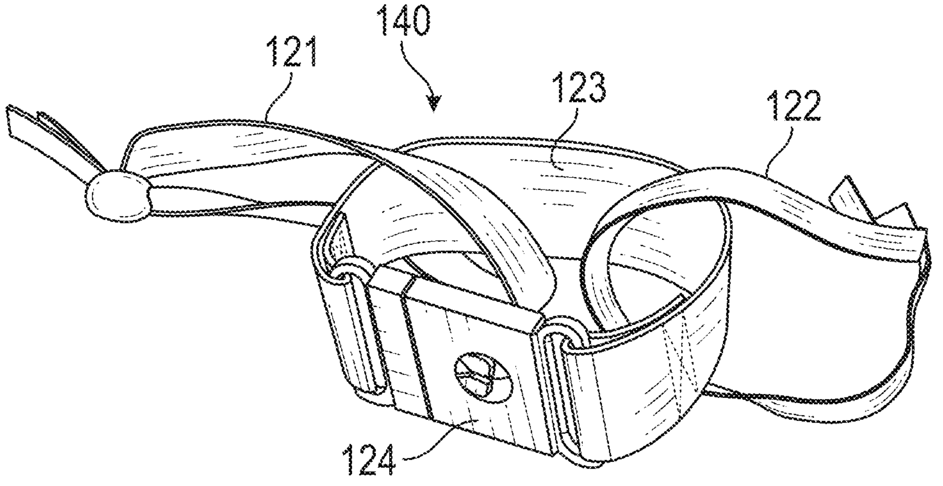
FIG. 12 illustrates a top side elevational view of another exemplary stirrup safety retainer with unsecured securing straps.

In some implementations, the securing bands 121, 122 can comprise a width $W_1$ between approximately 0.05 inches to 1 inches, between approximately 0.1 inches to 0.975 inches, between approximately 0.125 inches to 0.95 inches, between approximately 0.15 inches to 0.9 inches, between approximately 0.175 inches to 0.85 inches, between approximately 0.25 inches to 0.825 inches, between approximately 0.225 inch to 0.8 inch, or between approximately 0.25 inches to 0.75 inches. In some implementations, the securing bands 121, 122 can comprise a length $L_1$ perpendicular to the $W_1$ between approximately 1 inch to 18 inches, between approximately 3 inches to 15 inches, between approximately 6 inches to 12 inches, between approximately 7 inches to 11 inches, between approximately 8.0 inches to 10.0 inches, between approximately 8.25 inches to 10.75 inches, or between approximately 8.5 inches to 10.5 inches. It will be appreciated that numerous other materials could be utilized for the securing bands 121, 122. Indeed, as shown in FIG. 12, the securing bands 121, 122 can be rubber bands and/or other elastic bands or other bands and can be unsecured to the holding band 123. When the holding band 123 is deployed around the base of the stirrup 114 and buckled, unsecured securing bands 121, 122 would remain in position attached to the stirrup 114. In some implementations, the securing bands 121, 122 can be of a material different than an elastic material. Rather, for example, the securing bands 121, 122 could comprise a material that does not stretch and that could be deployed with buckles or other adjustable connection means (e.g., hook and loop materials such as Velcro®) to adjust their length to fit on the footwear 125 appropriately. The hook and loop system can comprise a hook component having a plurality of hooks, and the loop component can include a plurality of loops. The hooks can be designed to engage with the loops when the two components are pressed together, providing a fastening. Each hook can be shaped with a curved tip designed to catch and engage with the loops on the corresponding component. The hooks can be arranged in a grid pattern on a backing material for uniform distribution and to optimize fastening strength. The loops can be formed from fibers that are anchored to a backing material, creating a surface that can engage with the hooks. The loop density and/or fiber strength can be optimized to enhance the engagement with the hooks, ensuring a secure hold.

Figure 13:
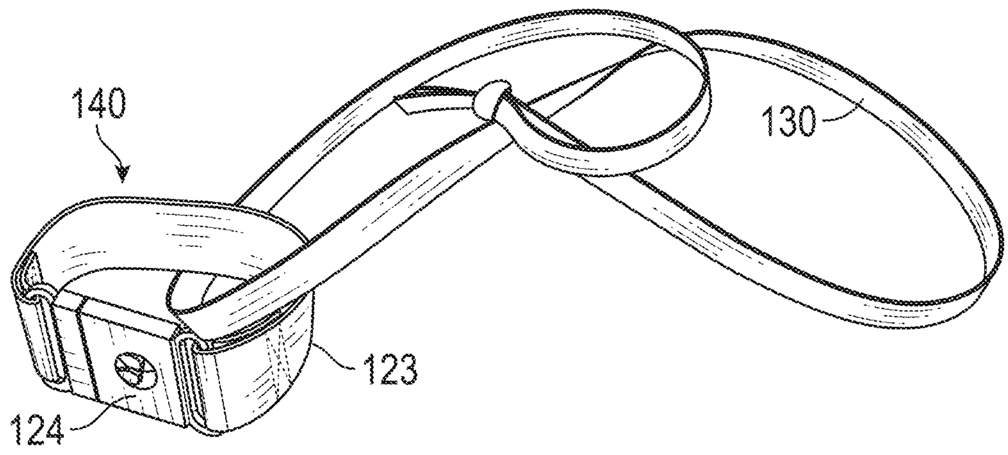
FIG. 13 illustrates a top side elevational view of an alternate stirrup safety retainer with a single unsecured securing strap.

Additionally, securing bands 121, 122 could be replaced, as shown in FIG. 13, by a single securing band 130. In such an implementation, the securing band 130 of the kit 140 would remain in position like the rubber bands mentioned above. And, such securing band 130 can comprise an elastic material but other suitable materials can also be used. Rather, the single securing band 130 can be equipped with one or more buckles (e.g., an adjustable buckle and/or an adjustment buckle) or other adjustable connecting means as discussed above. Such unsecured securing strap 130 can be deployed around the footwear 125 of the rider in the stirrup 114 in a manner to secure it by wrapping one end of the loop around the toe of the footwear 125 and the other end around the heel of the footwear 125. In some implementations, the unsecured securing strap 130 can be crossed over itself to form two loops in which one loop is placed around the toe and the other loop placed around the heel.

In some implementations, the holding band 123 comprises an elastic material. For example, the holding band 123 can comprise an elastic material similar to 1 inch woven clastic. Similar to the 0.25 inch woven elastic mentioned above, the 1 inch woven clastic can comprise rubber and/or synthetic threads braided together which can withstand repeated stretching and tension and can return to its original shape after being stretched. For example, the holding band 123 can elongate between approximately 25% to 200% of its original length, between approximately 30% to 190% of its original length, between approximately 35% to 185% of its original length, between approximately 40% to 180% of its original length, between approximately 45% to 155% of its original length, between approximately 50% to 175% of its original length, or between approximately 100% to 150% of its original length without breaking. In some implementations, the holding band 123 can comprise a width $W_2$ between approximately 0.05 inches to 2 inches, between approximately 0.1 inches to 1.9 inches, between approximately 0.15 inches to 1.85 inches, between approximately 0.25 inches to 1.75 inches, between approximately 0.5 inches to 1.50 inches, between approximately 0.75 inches to 1.25 inches, between approximately 0.85 inches to 1.15 inches, or between approximately 0.95 inches to 1.05 inches. In some implementations, the holding band 123 can comprise a length $L_2$ perpendicular to the width $W_2$ between approximately 0.5 inches to 12 inches, between approximately 1 inch to 10 inches, between approximately 2 inches to 8 inches, between approximately 3 inches to 7 inches, between approximately 4.0 inches to 6.0 inches, between approximately 4.25 inches to 5.75 inches, between approximately 4.5 inches to 5.5 inches, or between approximately 4.75 inches to 5.25 inches. It will be appreciated that numerous other materials could be utilized for the holding band 123. In addition, the holding band 123 can comprises a material other than an elastic material. Rather, holding band 123 could be comprised of a material that did not stretch and have buckles or other adjustable connection means (e.g., hook and loop materials, such as Velcro®) to adjust its length to fit on the stirrup 114 appropriately.

In some implementations, as shown in FIGS. 4 and 5, the connector 124 can be a 1 inch breakaway safety buckle. Breakaway safety buckles are often used in pet leash applications. Breakaway safety buckles can be designed for applications where a pet, for example, were to get its leash or tie caught on something could break free. Breakaway safety buckles can be designed to release with a force of between 2 and 8 kg (or, approximately 4 to 18 pounds). The release force ought to be strong enough such that one can move their feet all around in the stirrups and move the stirrups all around and not cause the buckle to breakaway. However, if the rider becomes unseated and begins to fall from the horse, the connector 124 rapidly and efficiently releases.

Figure 14:
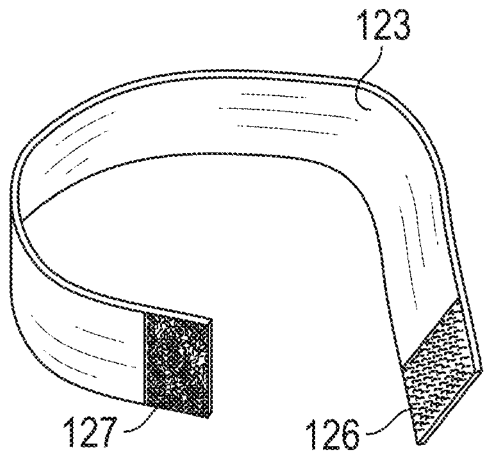
FIG. 14 illustrates a top side elevational schematic view of another exemplary stirrup safety retainer in which the connector comprises hook and loop material.
Figure 15:
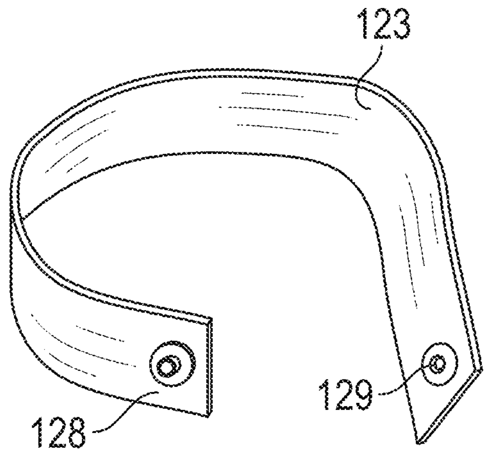
FIG. 15 illustrates a top side elevational schematic view another exemplary stirrup safety retainer in which the connector comprises magnetic material.

It will be appreciated that numerous other materials or devices could be utilized for or in place of the connector 124. One example, as shown in FIG. 14, is replacing the buckle with hook and loop material, such as Velcro®. In such an implementations, one side of the holding band 123 would be manufactured with the female portion 126 of hook and loop material, such as Velcro®, and the other with the male portion 127. Another example, as shown in FIG. 15, is replacing the connector 124 with a magnetic attachment. In such an implementations, one side of the holding band 123 would be manufactured with one magnetic portion of material 128 and the other with a magnetically attracted portion of material 129.

In another implementation, the holding band 123 can be eliminated entirely. In such an implementation, the connector 124 (or other releasable connection means) can be affixed directly to the stirrup 114 and the securing bands 121, 122 are attached to the stirrup 114.

Unless the context clearly requires otherwise, throughout the description and the claims, the words "comprise," "comprising," "include," "including" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Moreover, as used herein, when a first element is described as being "on" or "over" a second element, the first element may be directly on or over the second element, such that the first and second elements directly contact, or the first element may be indirectly on or over the second element such that one or more elements intervene between the first and second elements. Where the context permits, words in the above Detailed Description using the singular or plural number may also include the plural or singular number, respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments.

While certain implementations have been described, these implementations have been presented by way of example only, and are not intended to limit the scope of the disclosure. Indeed, the novel apparatus, methods, and systems described herein may be embodied in a variety of other forms; furthermore, various omissions, substitutions, and changes in the form of the methods and systems described herein may be made without departing from the spirit of the disclosure. For example, while blocks are presented in a given arrangement, alternative implementations may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further implementations. The accompanying claims and their equivalents are intended to cover such forms or modifications as would fall within the scope and spirit of the disclosure.

Several illustrative examples of stirrup safety retainers for horseback riding and related systems and methods have been disclosed. Although this disclosure has been described in terms of certain illustrative examples and uses, other examples and other uses, including examples and uses which do not provide all of the features and advantages set forth herein, are also within the scope of this disclosure. Components, elements, features, acts, or steps may be arranged or performed differently than described and components, elements, features, acts, or steps may be combined, merged, added, or left out in various examples. All possible combinations and subcombinations of elements and components described herein are intended to be included in this disclosure. No single feature or group of features is necessary or indispensable.

Certain features that are described in this disclosure in the context of separate implementations may also be implemented in combination in a single implementation. Conversely, various features that are described in the context of a single implementation also may be implemented in multiple implementations separately or in any suitable subcombination. Moreover, although features may be described above as acting in certain combinations, one or more features from a claimed combination may in some cases be excised from the combination, and the combination may be claimed as a subcombination or variation of a subcombination.

Further, while illustrative examples have been described, any examples having equivalent elements, modifications, omissions, and/or combinations are also within the scope of this disclosure. Moreover, although certain aspects, advantages, and novel features are described herein, not necessarily all such advantages may be achieved in accordance with any particular example. For example, some examples within the scope of this disclosure achieve one advantage, or a group of advantages, as taught herein without necessarily achieving other advantages taught or suggested herein. Further, some examples may achieve different advantages than those taught or suggested herein.

Some examples have been described in connection with the accompanying drawings. The figures may or may not be drawn and/or shown to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components may be added, removed, and/or rearranged. Further, the disclosure herein of any particular feature, aspect, method, property, characteristic, quality, attribute, element, or the like in connection with various examples may be used in all other examples set forth herein. Additionally, any methods described herein may be practiced using any device suitable for performing the recited steps.

For purposes of summarizing the disclosure, certain aspects, advantages, and features of the inventions have been described herein. Not all, or any such advantages are necessarily achieved in accordance with any particular example of the inventions disclosed herein. No aspects of this disclosure are essential or indispensable. In many examples, the devices, systems, and methods may be configured differently than illustrated in the figures. or description herein. For example, various functionalities provided by the illustrated modules may be combined, rearranged, added, or deleted. In some implementations, additional or different processors or modules may perform some or all of the functionalities described with reference to the examples described and illustrated in the figures. Many implementation variations are possible. Any of the features, structures, steps, or processes disclosed in this specification may be included in any example.

What is claimed is:

1. A stirrup safety retainer configured for use with a stirrup on a saddle for a horse, the stirrup safety retainer comprising:

a first strap having a first end and a second end, wherein a first connector is attached to the first end of the first strap and a second connector is attached to the second end of the first strap, such that when the first and second connectors are brought together, they are configured to releasably joining the first and second end of the first strap;

a second strap connected to the first strap; and a third strap connected to the first strap;

wherein during use of the stirrup safety retainer, the stirrup safety retainer couples a foot of a user to the stirrup, the second strap forming a toe loop engaging a first portion of a footwear of the user and the third strap forming a heel loop engaging a second position of the footwear.

2. The stirrup safety retainer of claim 1, wherein the first and second connectors comprise, respectively, male and female portions of a safety breakaway buckle.

3. The stirrup safety retainer of claim 1, wherein the first and second connectors comprise, respectively, male and female portions of a hook and loop material.

4. The stirrup safety retainer of claim 1, wherein the first and second connectors comprise, respectively, materials having magnetic attraction to one another.

5. The stirrup safety retainer of claim 1, wherein the first strap comprises an elastic material.

6. The stirrup safety retainer of claim 1, wherein the second strap comprises an elastic material.

7. The stirrup safety retainer of claim 1, wherein the third strap comprises an elastic material.

8. The stirrup safety retainer of claim 1, wherein the first and second connectors comprise, respectively, male and female portions of a safety breakaway buckle and wherein the first, second, and third straps comprise an elastic material.

9. The stirrup safety retainer of claim 1, wherein the second strap and the third strap are connected to the first strap proximate to the first connector and the second connector, respectively.

10. The stirrup safety retainer of claim 1, wherein the second strap and the third strap are connected to the first strap at a position at half a length of the first strap.

11. The stirrup safety retainer of claim 1, wherein the second strap is coupled to a first lateral edge of the first strap and the third strap is coupled to a second lateral edge of the first strap opposite the first lateral edge such that, when the first and second connectors are joined to form a closed loop with the first strap, the second strap and the third strap are positioned on opposite sides from one another.

12. A stirrup safety retainer configured to releasably hold a foot of a rider in the stirrup on a saddle for a horse, the stirrup safety retainer comprising:

a first strap having a first end and a second end, wherein a first portion of a safety breakaway connector is attached to the first end of the strap and a second portion of the safety breakaway connector is attached a to the second end of the strap, such that when the first and second portions of the safety breakaway connector are brought together, they are configured to releasably join the first and second end of the first strap;

a second strap connected to the first strap; and a third strap connected to the first strap;

wherein during use of the stirrup safety retainer, the stirrup safety retainer couples a foot of a user to the stirrup, the second strap forming a toe loop engaging a first portion of a footwear of the user and the third strap forming a heel loop engaging a second position of the footwear.

13. The stirrup safety retainer of claim 12, wherein the first strap, the second strap, and the third strap comprises an elastic material.

14. The stirrup safety retainer of claim 12, wherein the second strap and the third strap are connected to the first strap proximate to the first portion of the safety breakaway connector and the second portion of the safety breakaway connector, respectively.

15. The stirrup safety retainer of claim 12, wherein the second strap and the third strap are connected to the first strap at a position at half a length of the first strap.

16. The stirrup safety retainer of claim 12, wherein the second strap is coupled to a first lateral edge of the first strap and the third strap is coupled to a second lateral edge of the first strap opposite the first lateral edge such that, when the first and second portions of the safety breakaway connector are joined to form a closed loop with the first strap, the second strap and the third strap are positioned on opposite sides from one another.

* * * * *